United States Patent [19]
Drozdowicz et al.

[11] Patent Number: 5,280,338
[45] Date of Patent: Jan. 18, 1994

[54] MULTI-GRATING SPECTROGRAPH AND METHOD OF CHANGING GRATINGS

[75] Inventors: Zbigniew Drozdowicz, Orange; Traian Manta, Stamford, both of Conn.

[73] Assignee: Oriel Corporation, Stratford, Conn.

[21] Appl. No.: 969,097

[22] Filed: Oct. 30, 1992

[51] Int. Cl.⁵ .............................. G01J 3/28; G01J 3/06
[52] U.S. Cl. ...................................... 356/328; 356/334
[58] Field of Search ......... 356/305, 326, 328, 330–334; 359/17, 572

[56] References Cited

U.S. PATENT DOCUMENTS 4,988,196  1/1991  Gilligan ............................... 356/328

FOREIGN PATENT DOCUMENTS 2047423  11/1980  United Kingdom ................ 356/334

OTHER PUBLICATIONS

"Spectrometers"—Made to Measure, The new M Series spectrometers from SPEX etc.—SPEX Industries, Inc., Edison, NJ, date unknown.

Primary Examiner—Vincent P. McGraw
Assistant Examiner—K. P. Hantis
Attorney, Agent, or Firm—St. Onge Steward Johnston & Reens

[57] ABSTRACT

An improved multiple grating spectrograph is provided comprising a grating changer for mounting gratings, and rotatable about an axis substantially perpendicular to grating lines such that changing from one grating to another preserves the wavelength-selecting angle of incidence of electromagnetic radiation. The grating changer preferably includes a grating holder, and an actuator for moving the holder about the axis.

20 Claims, 7 Drawing Sheets

MULTI-GRATING SPECTROGRAPH AND METHOD OF CHANGING GRATINGS

FIELD OF THE INVENTION

The invention relates to spectrographs, monochromators, and other similar devices of the type having multiple diffraction gratings, and more specifically to a spectrograph including a grating changing apparatus providing improved alignment of successively selected gratings with the incident electromagnetic radiation.

BACKGROUND OF THE INVENTION

In conventional spectrographs, a single diffraction grating is positioned in the path of the incident electromagnetic radiation. When a different grating is desired, the spectrograph must be at least partially dissembled, the original grating removed and the new grating installed. This is extremely disadvantageous, both in terms of time and inconvenience, but also because of the potential for loss of accuracy due to accidental manipulation of spectrometer elements during the change of gratings.

Multiple diffraction grating spectrographs are known in the prior art, e.g., Spex Industries, Inc. of Edison, N.J. offers "M Series" spectrometers with a dual-grating turret in which gratings are alternately selected by rotating the turret about an axis parallel to the grating line direction.

However, a disadvantage of this design is that changing from one diffraction grating to another requires rotating the grating holder in a direction which changes the angle between incident electromagnetic radiation and the plane of the diffraction grating in a direction perpendicular to the grating lines. This angle is critical to selection of a particular wavelength band for examination by the spectrograph and may need to be reset each time the diffraction grating is changed, making data collection inefficient and tedious.

What is desired, therefore, is a multiple diffraction grating spectrograph which permits changing of the grating without unnecessarily affecting the critical wavelength selecting angle between incident electromagnetic radiation and the plane of the grating.

SUMMARY OF THE INVENTION

Accordingly, it is an object of the invention to provide a multiple grating spectrograph which is relatively efficient in operation and simple in use.

Another object of the invention is to provide a multiple grating holder and method which changes gratings without altering the alignment of successive gratings with incident electromagnetic radiation along the most critical, wavelength-selecting axis.

A further object of the invention is to provide a multiple grating changer which changes gratings by moving them about an axis perpendicular to the grating lines, which typically requires less critical positioning.

Yet another object of the invention is to provide a multiple grating changer which releasably locks successive gratings substantially into alignment with the incident beam.

Still another object of the invention is to provide a multiple grating changer of the above character which positions the gratings so that the wavelength-selecting rotational axis lies on the grating surface.

Other objects of the invention will be obvious and may in part appear hereinafter.

These and other objects are achieved by provision of an improved multiple grating spectrograph comprising a grating changer for mounting gratings. The grating changer is rotatable about an axis substantially perpendicular to grating lines such that changing from one grating to another preserves the wavelength-selecting angle of incidence of electromagnetic radiation. The grating changer preferably includes a grating holder, and an actuator for moving the holder about the axis. The grating changer most preferably also includes a detent for releasably locking the holder with a grating in aligned position with respect to incident radiation.

The spectrograph preferably includes, in a usual manner, a plate rotatable about a second axis which is substantially parallel to the grating lines for adjusting the wavelength-selecting angle of incidence between the radiation and the grating surface as measured in a direction substantially perpendicular to the grating lines.

In another aspect, the invention relates to a method of changing a diffraction grating in a spectrograph without altering the wavelength-selecting angle of incidence with electromagnetic radiation, comprising the steps of providing at least two diffraction gratings, providing a grating holder on which the diffraction gratings are mounted, and rotating the holder about an axis substantially perpendicular to the grating lines. The method also preferably includes the step of releasably locking the holder to provide the diffraction grating in position aligned with the incident radiation.

The invention and its particular features will become more apparent from the following detailed description considered with reference to the accompanying drawings.

BRIEF DESCRIPTION OF THE DRAWINGS

FIG. 4A is a schematic front isometric view.

DETAILED DESCRIPTION OF THE INVENTION

Figure 1:
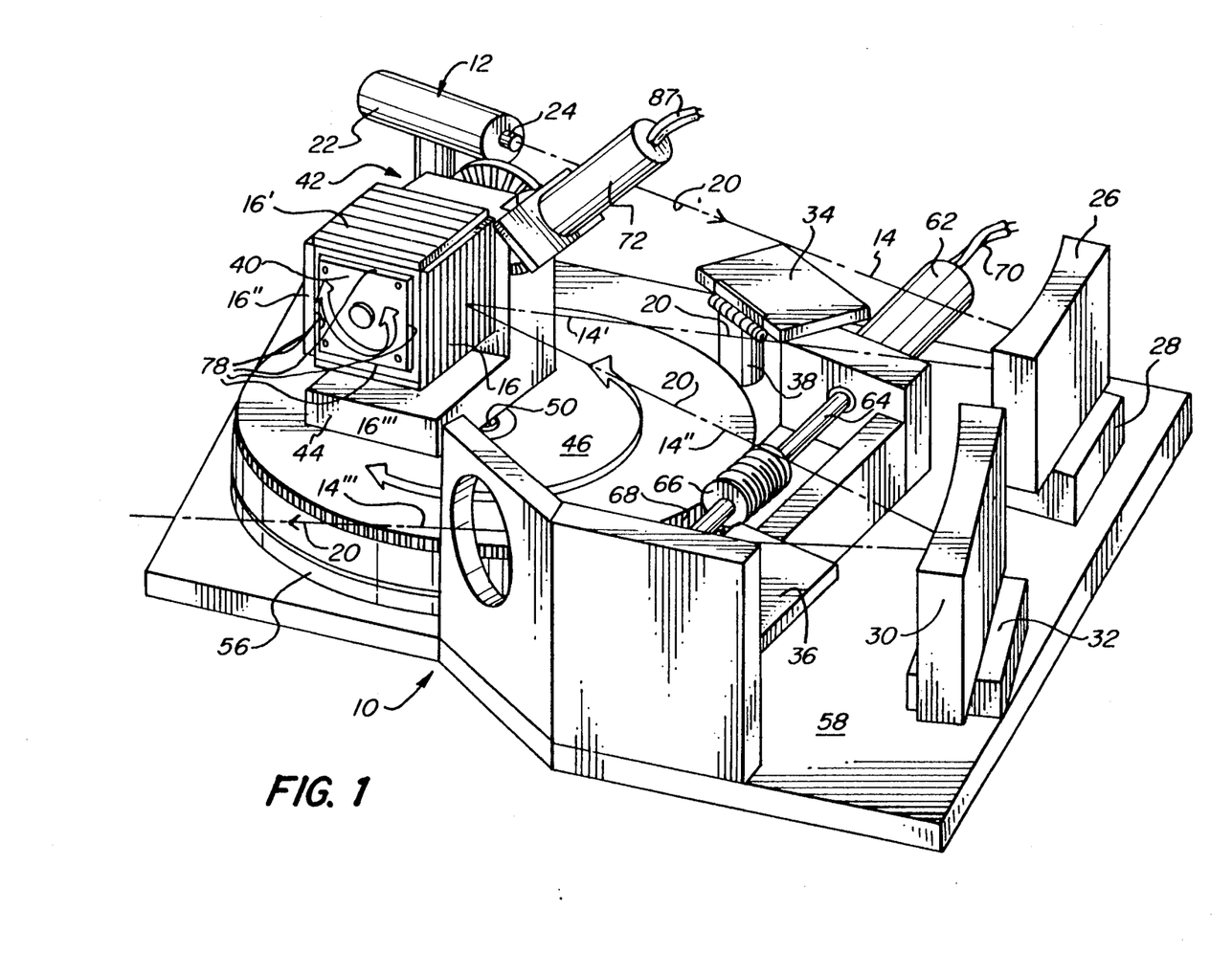
FIG. 1 is a front isometric view of a multiple grating spectrograph in accordance with the invention.
Figure 2:
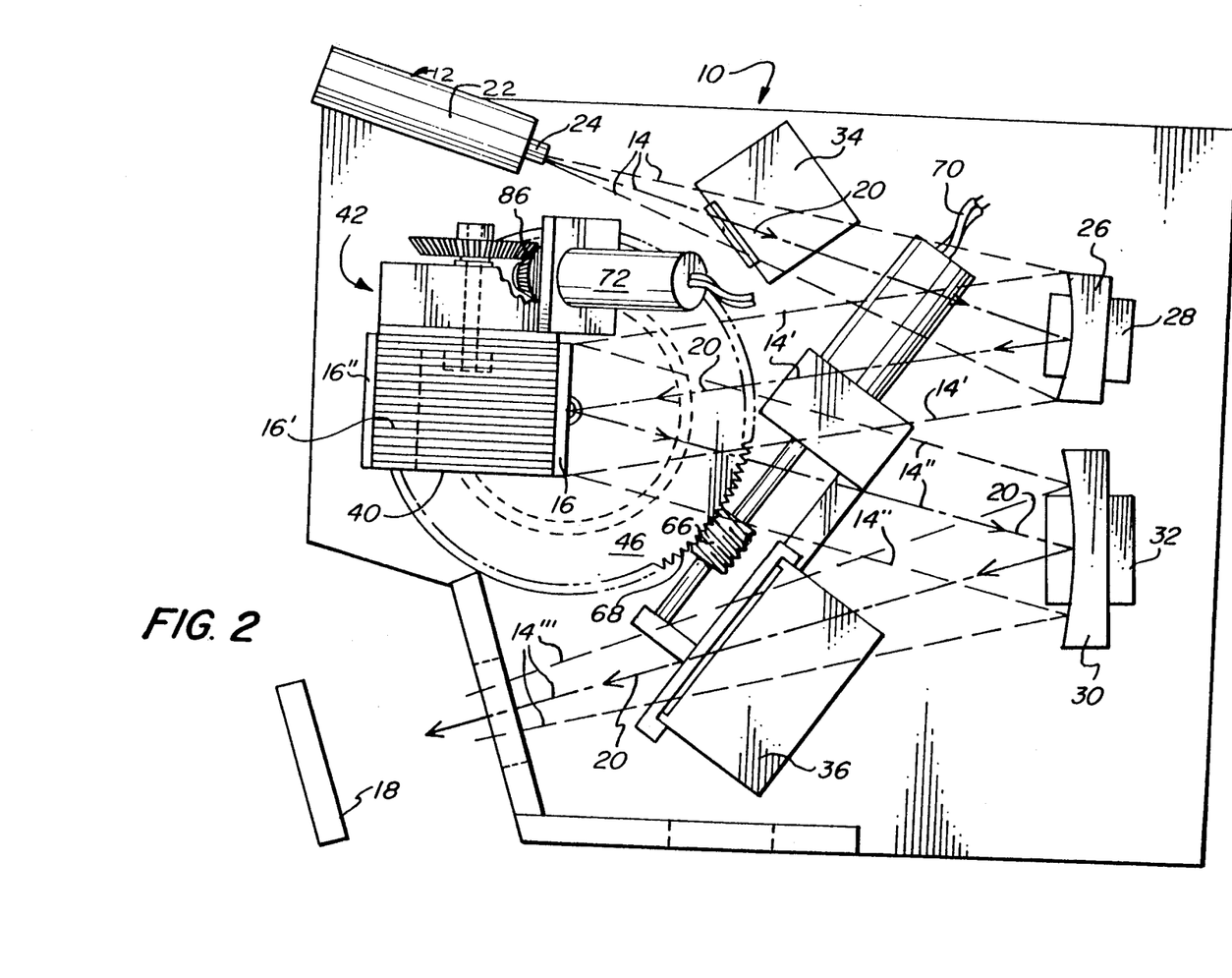
FIG. 2 is a top plan view of the multiple grating spectrograph of FIG. 1.

FIGS. 1 and 2 are front isometric and top plan views, respectively, of a multiple grating spectrograph or spectrometer 10 in accordance with the invention. A usual application of spectrograph 10 generally comprises a source 12 of electromagnetic radiation indicated as lines 14, a means such as a grating 16 for diffracting radiation, and a detector 18 (FIG. 2 only) for receiving the diffracted radiation. In the configuration of spectrograph 10 illustrated in FIGS. 1 and 2, electromagnetic radiation follows a beam path illustrated by arrows 20 from source 12 to detector 18 via grating 16. It is understood that other configurations and beam paths which involve these and other elements, such as a collimating grating, are possible and may be desired for particular applications.

Radiation from source 12 is restricted by a resolution-defining slit 24. In this regard, source 12 preferably provides a plurality of diverging rays 14 of electromagnetic radiation and it is understood that a laser 22 may be used in combination with slit 24 to provide these diverging rays. Diverging rays 14 exiting slit 24 are directed to a collimator 26. Collimator 26 receives diverging rays 14, converts them to parallel rays 14' of electromagnetic radiation, and directs them toward diffraction grating 16. In this regard, collimator 26 includes a base 28 adjustable to alter the direction of parallel rays 14'.

Collimator 26 is preferably provided as a collimating mirror for applications involving a broad range of wavelengths. It is understood, however, that refractive, reflective, diffractive or other type collimators may be used for different type sources 12 or beam paths 20, and that a source of parallel radiation such as a laser may be substituted for the combination of a point source of radiation and a collimator.

Detector 18 may be provided as a single element, linear array, two dimensional array or other more sophisticated detector which may be linked to one or more multichannel analyzers for data collection and analysis in technical or other applications involving high performance spectral analysis. It is understood that a variety of detectors are possible depending upon the electromagnetic source used and the measurements sought. A focusing or imaging element 30 is shown collecting the diffracted rays 14" and diverting them as indicated at 14''' toward detector 18 where a spectrally (or spectrally and spatially) resolved image of entrance slit 24 is formed.

Focuser 30 receives parallel rays 14" of electromagnetic radiation from diffraction grating 16, converts them to converging rays 14''', and directs them toward detector 18. In this regard, focuser 30 includes a base 32 adjustable to alter the direction and focus of converging rays 14'''. Focuser 30 is preferably provided as an imaging mirror. It is understood, however, that lenses or other imaging devices may also be used depending upon the desired beam path or type of electromagnetic radiation.

Spectrograph 10 preferably includes one or more mirrors 34, 36 or other devices for altering beam path 20. Mirrors 34, 36 are shown face down in FIGS. 1 and 2, but most preferably include kinematic mounts 38 (only one shown, see FIG. 1) so that they can be moved into and out of beam path 20 reproducibly and without altering the alignment of other portions of the instrument. Alternatively, mechanized versions of mirrors 34, 36 can be used for remote actuation. Mirror 34 is mounted between source 12 and collimator 26, and can be used to provide incident electromagnetic radiation from a second source (not shown). Mirror 36 is mounted between focuser 30 and detector 18, and can be used to provide a focused beam of diffracted electromagnetic radiation to a second detector (also not shown).

Figure 3:
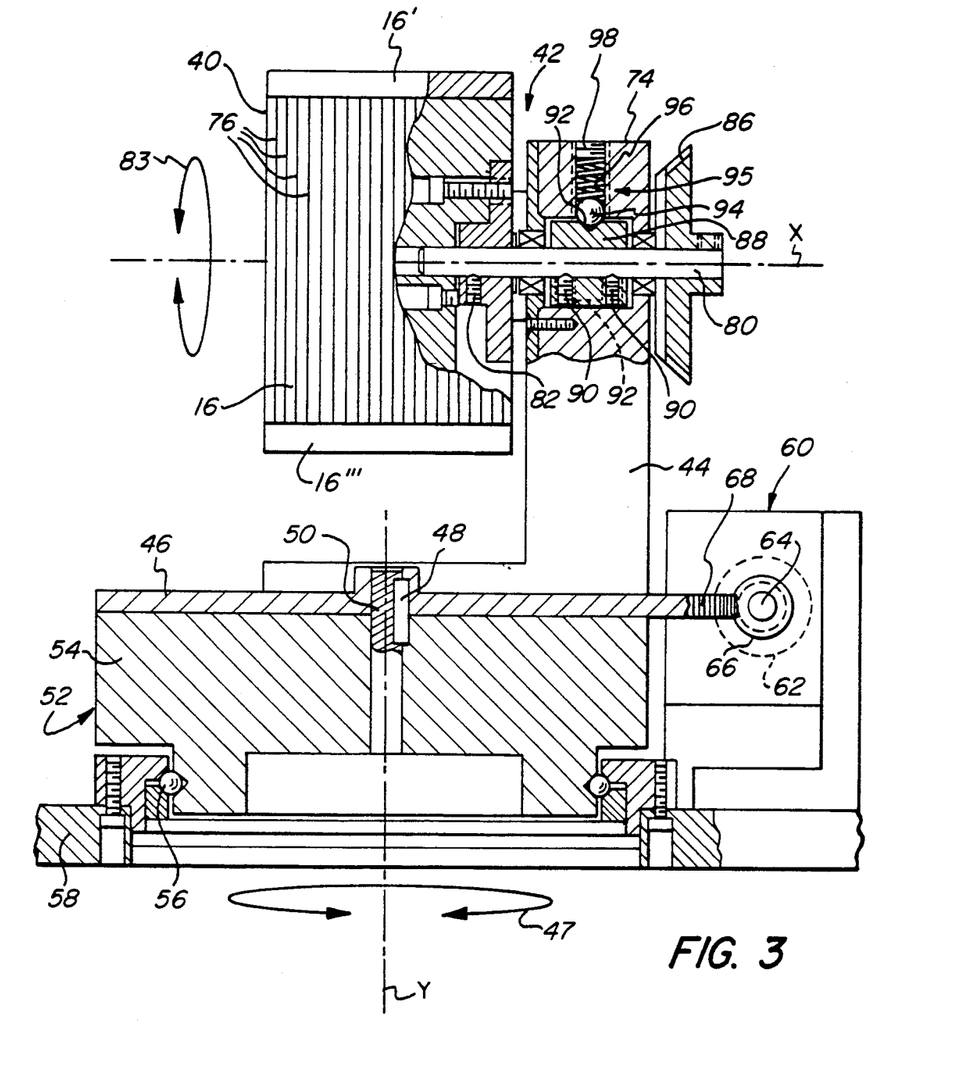
FIG. 3 is a partially broken-away side cross-sectional view of the grating changer and turntable assemblies of the multiple grating spectrograph of FIG. 1.

Referring now to FIGS. 1, 2 and 3, diffraction grating 16 is mounted, and preferably releasably, removeably mounted, to a grating holder 40 comprising an element of a grating changer assembly 42. Grating changer assembly 42 also includes a motor 72 or other actuator for rotating grating holder 40, and a locking frame 74 for releasably locking grating holder 40 in position such that grating 16 is in an aligned position with beam path 20.

By "aligned position" is meant that rays of electromagnetic radiation 14' strike grating 16 at an angle alpha (see FIG. 6A) of about ninety degrees as measured in a direction substantially parallel to grating lines 76. By grating "lines" is meant the plurality of parallel, spaced apart grooves, slits, lines or the like which are ruled, evaporated, cut, cast, etched, or the like on grating 16.

Grating holder 40 includes two, three, four or more sides 78 (see FIGS. 1 and 6A) for prealigned mounting, and preferably releasably, replaceably mounting diffraction gratings 16, 16', 16", 16''', respectively. Grating holder 40 is mounted to a shaft 80 by a set screw 82 or the like for rotation about an axis X as indicated by arrow 83 illustrated in FIG. 3. Axis X is preferably substantially perpendicular to the direction substantially parallel to grating lines 76. In this regard, rotation of holder 40 about axis X changes which grating 16, 16', 16" or 16''' is in the aligned position but does not alter respective wavelength-selecting angle of incidence beta (see FIG. 5A) between radiation rays 14' and particular grating 16 as measured in a direction substantially perpendicular to grating lines 76. It is understood that angle beta can be slightly different for gratings 16, 16', 16" and 16''' but will be very reproducible for each one individually.

Actuator 72 is coupled to shaft 80 for rotating grating holder 40 by a bevel gear 86 (see FIG. 2). Actuator 72 can be automatically operated via lines 87 (see FIG. 1) with a controller (not shown) to rotate successive gratings into the aligned position. Once rotated to the aligned position, locking frame 74 releasably locks them in place (see FIG. 3).

Locking frame 74 includes a hub 88 mounted for rotation with shaft 80 by set screws 90 or the like. Hub 88 includes a plurality of peripheral recesses 92 spaced apart at intervals, preferably even intervals, around the circumference of hub 88. Preferably, the number of recesses matches the number of sides 78 of grating holder 40 such that each grating can be releasably locked in the aligned position. Hub 88 and thus the grating holder 40 is releasably locked when recesses 92 receive ball 94 biased thereinto by spring 96. Recesses 92 and spring-biased ball 94 for a detent mechanism 95 for releasably locking diffraction gratings 16, 16', 16", 16''' in the aligned position. The compression of spring 96 may be adjusted by means of screw 98.

In operation, actuator 72 rotates shaft 80, thereby rotating grating holder 40 about axis X, bringing a different grating into alignment position. As grating holder 40 rotates, hub 88 is rotating with shaft 80. Actuator 72 stops its rotating action as one of detents 92 is positioned such that ball 94 sits on the edge of detent 92. The action of spring 96 then forces ball 94 into detent 92, moving grating holder 40, and thereby the grating to be positioned, into its proper alignment position.

Referring now to FIG. 3, grating changer 42 includes a base 44 mounted for rotation with a plate 46 about an axis Y as indicated by arrow 47. In this regard, plate 46 and base 44 may be jointly connected with a key 48 on a shaft 50 lying along axis Y. Alternatively, base 44 may be fastened to plate 46 by other means.

Figure 7:
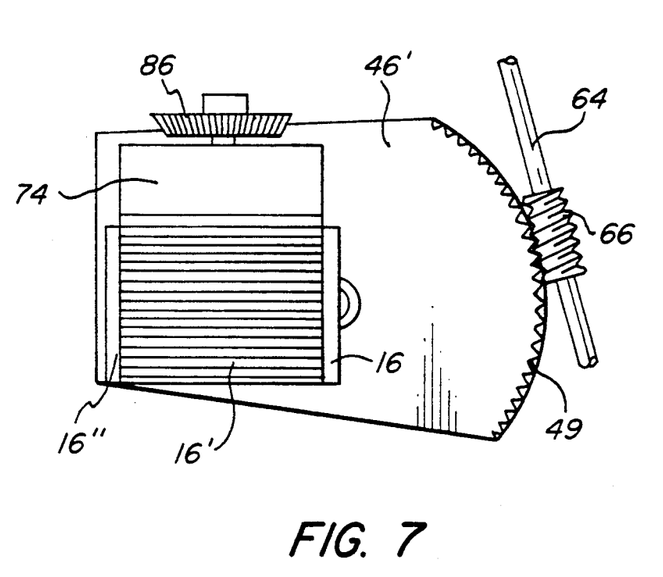
FIG. 7 is a partial top plan view depicting an alternative embodiment of the turntable of the multiple grating spectrograph of FIG. 1.

Plate 46 may be provided as a circular disk as shown, or as an irregular shape or circular portion 46' having a curving edge 49 (see FIG. 7). Plate 46 forms part of a turntable assembly 52 which also includes a plate base 54, a bearing 56 connected to spectrograph base 58 (see FIGS. 1 and 3) for rotatably mounting plate 46 and plate base 54, and a spectral drive or other actuator 60 for rotating plate 46.

Actuator 60 preferably comprises a stepper motor 62 for rotating a shaft 64 including a worm gear 66 as shown in FIGS. 1 and 2. Actuator 60 is mounted to spectrograph base 58 such that worm gear 66 meshes with teeth 68 on plate 46 to rotate plate 46 by increments, which are preferably less than about 5 arc seconds. Stepper motor 62 may be automatically operated with a controller (not shown) via lines 70.

Rotation of plate 46 causes rotation of grating changer 42 and thus rotation of grating 16 which alters wavelength-selecting angle of incidence beta (see FIG. 5A) between beam path 20 and the grating to select a particular wavelength band of source 12 radiation for examination at detector 18. The operative surface of grating 16 is preferably coplanar with, and centered on axis Y, such that beam path 20 will strike the center of grating 16 regardless of the magnitude of beta. This permits relatively smaller diffraction gratings to be used, and relatively more gratings to be mounted on a grating holder. Wavelength-selecting angle of incidence beta is equivalent to the angle between beam path 20 and axis X.

Figure 5A:
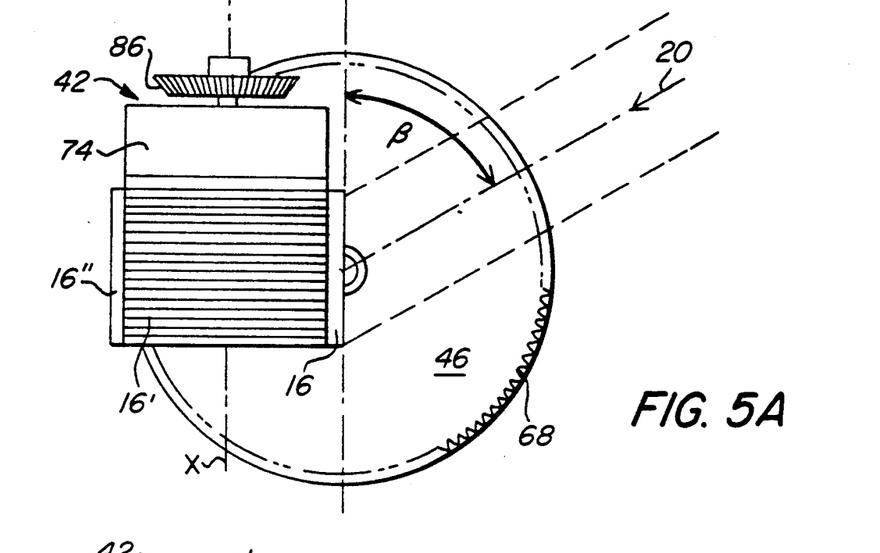
FIGS. 5A and 5B are schematic top plan views of the grating changer and turntable of the multiple grating spectrograph of FIG. 1.
Figure 5B:
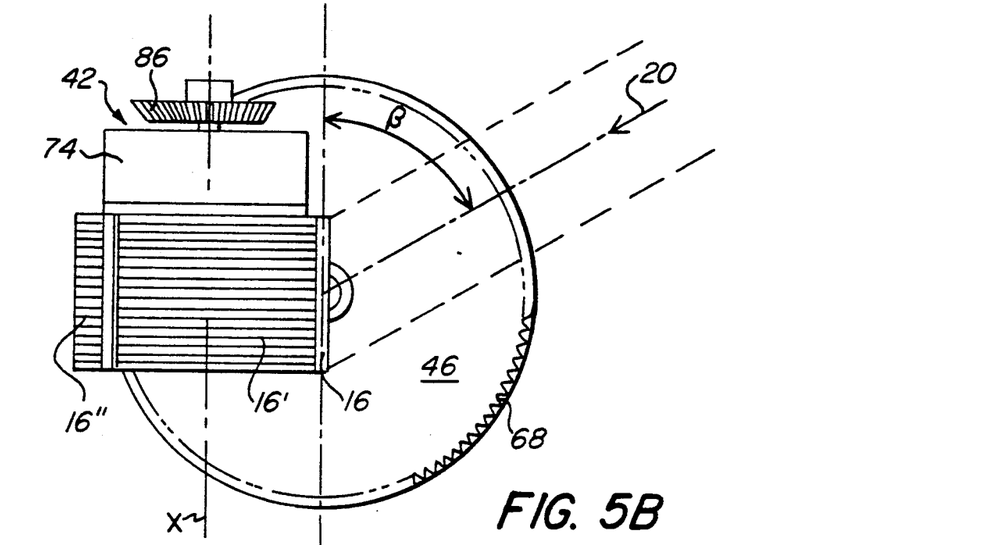
Figure 6A:
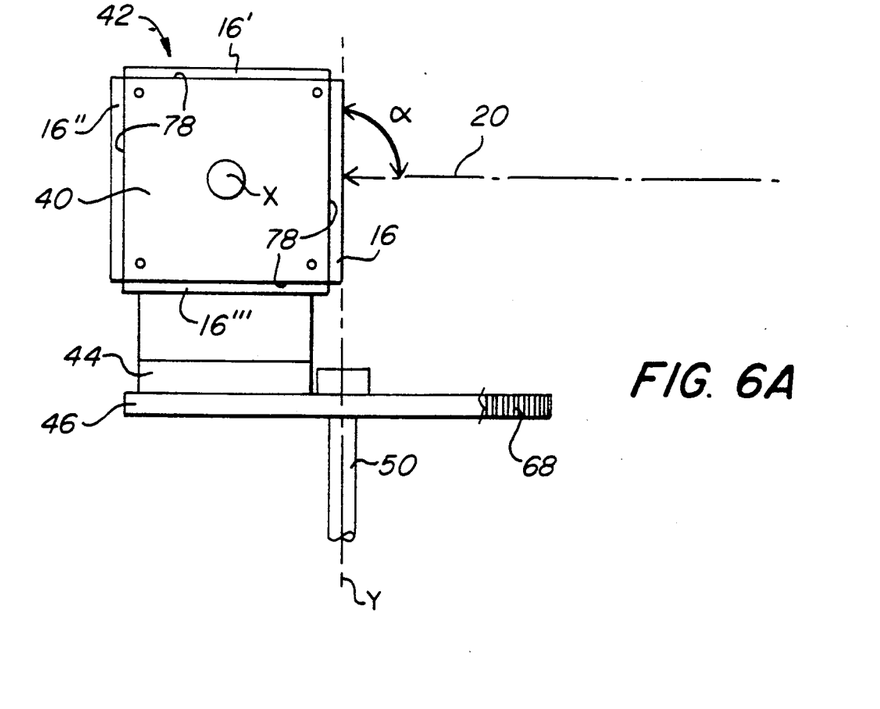
FIGS. 6A and 6B are schematic side elevation views of the grating changer and turntable of the multiple grating spectrograph of FIG. 1.
Figure 6B:
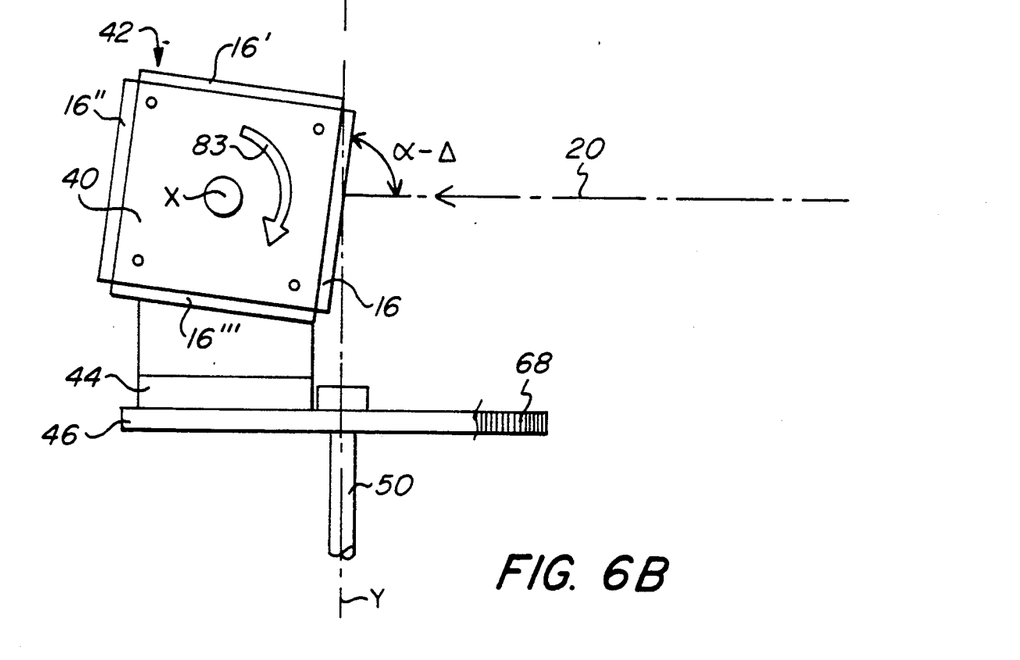

FIGS. 5A, 5B, 6A and 6B depict grating changer 42 with the same angle of incidence beta. In FIGS. 5A and 6A, diffraction grating 16 is shown in the aligned position with alpha equal to about ninety degrees. In FIGS. 5B and 6B, however, grating holder 40 is shown rotating about axis X to change from grating 16 to grating 16' in the aligned position. During this grating change, angle alpha changes but angle of incidence beta is not substantially changed. Similarly, once grating 16' has been releasably locked in the aligned position by locking frame 74, angle of incidence beta remains substantially unchanged.

Figure 4A:
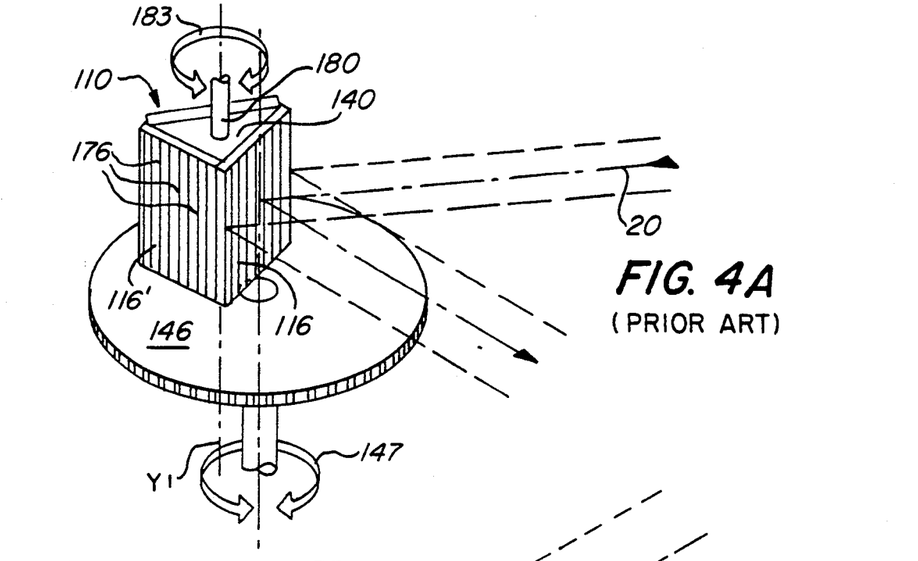
Figure 4B:
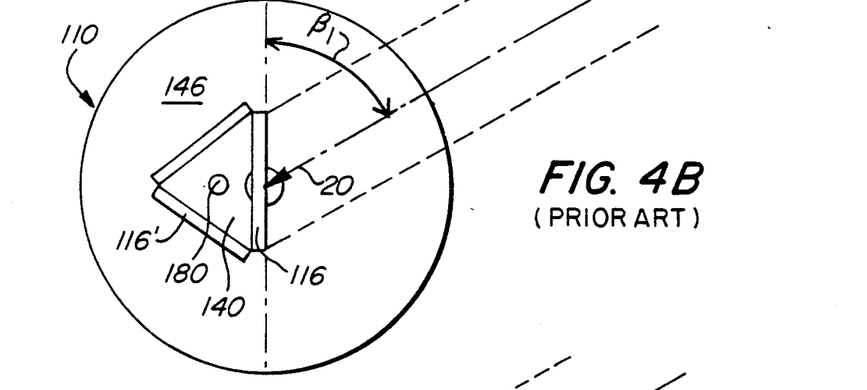
FIGS. 4B and 4C are schematic top plan views, of the grating changer and turntable of a prior art multiple grating spectrograph.
Figure 4C:
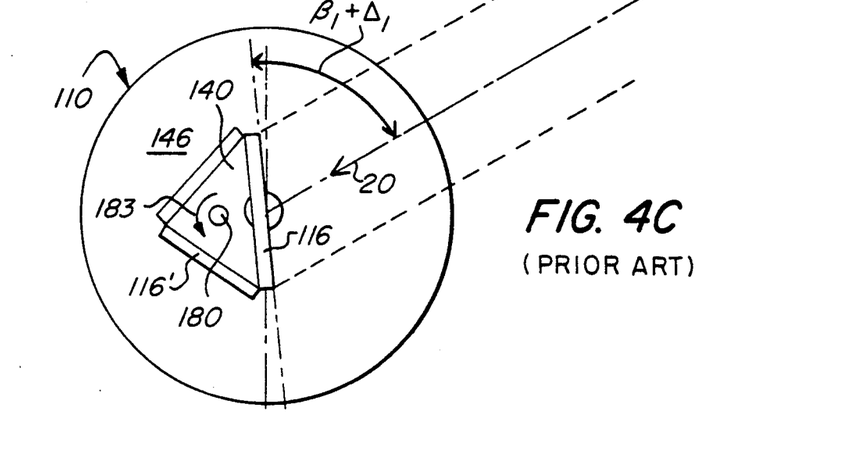

This design provides significant advantages over prior art spectrographs 110 schematically illustrated in FIGS. 4A, 4B and 4C. Grating holder 140 of prior art spectrograph 110 is mounted for rotation with shaft 180 about axis $Y_1$ as indicated by arrow 183. Because axis $Y_1$ is substantially parallel to grating lines 176, changing from grating 116 to grating 116' necessarily changes wavelength-selecting angle of incidence $beta_1$ as illustrated in FIG. 4C. Because the angular sensitivity of beta, $beta_1$ is significantly higher than the angular sensitivity of alpha, changing from grating 116 to grating 116' may require system recalibration and rotation of plate 146 as indicated by arrow 147, a time consuming and involved procedure.

It is understood that aligning grating lines in parallel with the axis of rotation of the plate in both the prior art spectrographs and the spectrograph of the invention permits variation of the spacing between grating lines by changing angle of incidence beta, $beta_1$. The advantage of the invention then, is to permit changing of the grating while preserving the angle of incidence beta by rotating grating holder 40 about an axis perpendicular to the grating lines and thus also perpendicular to axis X.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A spectrograph for analyzing a source of electromagnetic radiation comprising:
   at least two diffraction gratings having a plurality of lines;
   a grating holder for removably, replaceably mounting said diffraction gratings;
   an actuator for moving said grating holder about a first axis to change which of said diffraction gratings is exposed to radiation from the source; and
   a plate rotatable around a second axis, said grating holder connected for rotation with said plate, said second axis aligned substantially parallel to the plurality of diffraction grating lines such that rotation of said plate changes the angle of incidence at which radiation from the source strikes said diffraction grating;
   said first axis substantially perpendicular to the lines on said gratings such that operation of said actuator to change said diffraction grating does not unnecessarily change the wavelength-selecting angle of incidence.

2. The spectrograph of claim 1 wherein said diffraction grating is planar.

3. The spectrograph of claim 2 including a collimator for receiving electromagnetic radiation from the source and for producing a parallel beam of radiation for presentation to said diffraction grating.

4. The spectrograph of claim 3 wherein said collimator is a collimating mirror.

5. The spectrograph of claim 1 wherein said diffraction grating is reflective.

6. The spectrograph of claim 5 including at least one mirror operable to alter the path of the electromagnetic radiation.

7. The spectrograph of claim 6 wherein said mirror is a focusable imaging mirror.

8. A grating changer for a spectrograph including at least two diffraction gratings, the changer comprising:
   a grating holder having at least two sides and mounted to a shaft for rotation about a first axis, the diffraction gratings mounted to sides of said holder such that lines of the gratings are aligned substantially perpendicular to the first axis;
   an actuator operably connected to the shaft for rotating said holder to change the diffraction grating in a position aligned with the path of a beam of electromagnetic radiation while preserving the angle of incidence between the beam and a direction substantially parallel to the first axis.

9. The grating changer of claim 8 wherein said actuator comprises a motor, and a bevel gear coupling said motor to the shaft of said holder.

10. The grating changer of claim 8 wherein said holder includes detent means for releasably locking the diffraction gratings in the aligned position with the beam of radiation.

11. The grating changer of claim 10 wherein said detent means comprises a spring-biased ball.

12. The grating changer of claim 11 wherein said detent means comprises a hub having a hub diameter greater than a diameter of the shaft, said hub mounted for rotation with the shaft and including spaced-apart, peripheral detents for receiving said spring-biased ball.

13. In a multiple grating spectrograph of the type including at least two diffraction gratings having a plurality of lines, a grating changer for mounting said gratings, and a plate rotatable about a first axis, said changer connected for rotation with said plate to change the angle of incidence at which radiation from an electromagnetic source strikes said grating, the improvement comprising said grating changer rotatable about a second axis substantially perpendicular to the grating lines and the first axis such that changing from one grating to another grating does not change the angle of incidence.

14. The spectrograph of claim 13 including detent means for releasably locking said grating changer to provide a diffraction grating in aligned position with the source.

15. The spectrograph of claim 13 wherein said grating changer includes a shaft and a grating holder, said grating holder having at least two sides for mounting the diffraction gratings, said grating holder mounted for rotation with the shaft about the second axis.

16. The spectrograph of claim 15 comprising at least three diffraction gratings, and wherein said grating holder has at least three sides for mounting the diffraction gratings.

17. The spectrograph of claim 16 comprising four diffraction gratings, and wherein said grating holder has at least four sides for mounting the diffraction gratings.

18. The spectrograph of claim 15 wherein said grating changer further includes an actuator and a bevel gear, said bevel gear operably coupling said actuator to the shaft.

19. A method of changing a diffraction grating in a spectrograph comprising the steps of:
   providing at least two diffraction gratings having a plurality of lines;
   providing a grating holder for mounting the diffraction gratings; and
   rotating the holder about an axis substantially perpendicular to the grating lines;
   whereby the grating may be changed without altering an angle between incident electromagnetic radiation and the axis.

20. The method of claim 17 including the step of releasably locking the holder to provide the diffraction grating in position aligned with the incident electromagnetic radiation.

* * * * *